United States Patent [19]

Efstathiou

[11] Patent Number: 5,258,189
[45] Date of Patent: Nov. 2, 1993

[54] METHOD FOR MAKING VITAMIN ENRICHED CEREAL

[75] Inventor: John D. Efstathiou, Plymouth, Minn.

[73] Assignee: General Mills, Inc., Minneapolis, Minn.

[21] Appl. No.: 937,613

[22] Filed: Aug. 28, 1992

[51] Int. Cl.$^5$ ............................................. A23L 1/303
[52] U.S. Cl. ..................... 426/73; 426/620; 426/621; 426/302; 426/457
[58] Field of Search ............... 426/73, 620, 621, 619, 426/618, 311, 575, 455, 456, 457, 458, 503, 454, 302

[56] References Cited

U.S. PATENT DOCUMENTS

| | | |
|---|---|---|
| 1,575,762 | 3/1926 | Hoffman et al. |
| 2,345,571 | 4/1944 | Briod et al. |
| 2,497,035 | 2/1950 | Seeder |
| 2,775,521 | 12/1956 | Mateles et al. |
| 3,767,824 | 10/1973 | Keyser et al. |
| 3,767,825 | 10/1973 | Hammes ............................... 426/311 |
| 3,784,716 | 1/1974 | Spangler .............................. 426/311 |
| 4,764,388 | 8/1988 | Sullivan et al. |

FOREIGN PATENT DOCUMENTS

708130  4/1965  Canada .................................. 426/73

Primary Examiner—Carolyn Paden
Attorney, Agent, or Firm—John A. O'Toole; L. MeRoy Lillehaugen

[57] ABSTRACT

A process for fortifying an R-T-E cereal with beta carotene is provided. By adding the heat labile beta carotene to a cooked cereal mass prior to piece forming and finish drying, a beta carotene fortified R-T-E cereal is obtained which surprisingly not only has not lost significant vitamin activity, but even more surprisingly exhibits superior vitamin stability upon storage than when equivalent amounts are applied topically to the cereal.

8 Claims, 1 Drawing Sheet

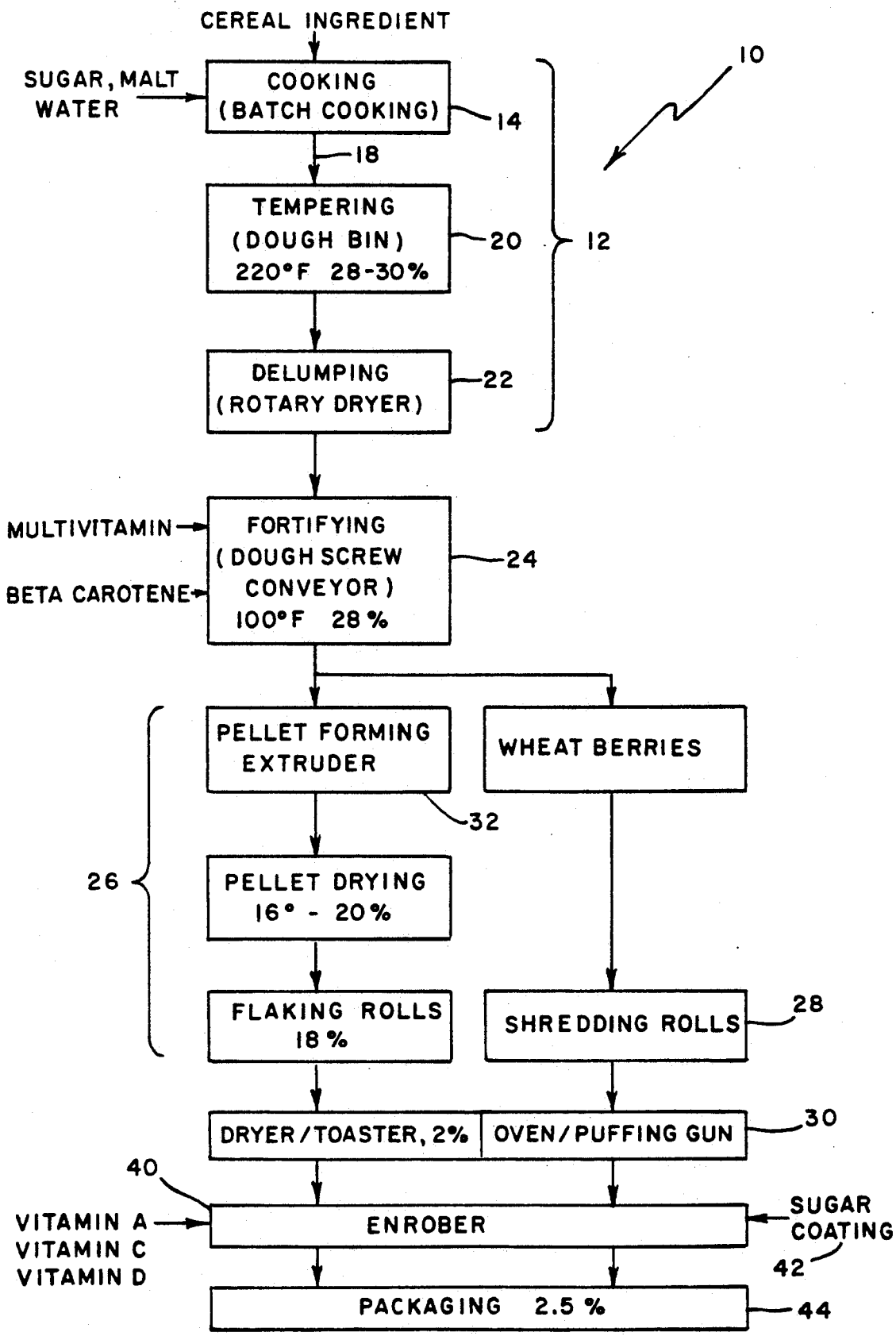

METHOD FOR MAKING VITAMIN ENRICHED CEREAL

BACKGROUND OF THE INVENTION

1. Field of the Invention

This invention relates to food products and methods for producing them. More specifically, this invention relates to a vitamin enriched ready-to-eat cereal made by a method wherein a dry vitamin premix and beta carotene are homogeneously admixed into the cooked cereal mass before piece forming and finish drying.

2. Description of the Prior Art

Breakfast cereal products are often enriched with vitamins. In known methods for making R-T-E cereals prepared from cooked cereal doughs, vitamins are generally applied in two separate portions. A first portion consisting of heat tolerant vitamins are generally incorporated into the cooked cereal dough. A second portion comprising heat sensitive or heat labile vitamins are generally sprayed onto the finished cereal pieces after pelleting, pellet shaping, drying, and toasting.

In order to topically apply the heat sensitive vitamins, a dry premix of the heat sensitive vitamins is mixed into a solution and sprayed onto the cereal pieces. Spraying the multivitamin solution onto the cereal pieces after such hot process steps as drying, toasting, baking, etc., prevents heat sensitive vitamins from degradation during these hot process steps. Vitamin degradation from cooking steps is particularly undesirable because of the formation of distasteful odors and flavors as well as the loss of heat labile vitamin activity.

While effective for certain vitamin types, the topical application of a vitamin solution is not without certain disadvantages. For instance, one problem is that topically applied vitamins can cause an undesirable flavor for the cereal piece When so applied on the surface area of the cereal pieces, the vitamin(s) are in direct contact with the cereal consumer's tongue upon consumption. With cereal products such as toasted flake cereal products having a high surface area, the amount of vitamins which come into contact with the consumer's tongue during consumption is increased. While applying a frosting to the cereal pieces after the vitamin solution has been sprayed onto the cereal pieces is helpful in masking the flavor of the vitamins, this process can also dilute the vitamin content present upon the cereal pieces.

Still another problem is vitamin ingredient loss during application. Vitamins are very expensive ingredients. Unfortunately, topical vitamin application can involve substantial physical loss of the vitamins upon application since not all the spray hits the cereal but also coats the application vessel, transport belts, etc. Typically, for every pound of vitamins consumed in the manufacturing process perhaps as little as 0.5 lb. ends up in the final dry cereal product.

Another problem is that once applied on or incorporated into an R-T-E cereal, vitamins can exhibit deterioration or loss of potency/bioavailability upon the extended storage typical of R-T-E cereal commercial distribution.

The prior art, of course, contains numerous teachings which attempt to overcome one or more of the above-noted problems.

For example, U.S. Pat. No. 3,767,824 to Keyser et al. discloses a method of coating cereal products with vitamins. This process requires that a cereal grain be pre-cooked, dried, and formed into particles. The cereal particles are then coated with vitamins The vitamins are prepared in a fatty composition before their application to the cereal particles. The '824 patent states that the addition of vitamins to a cereal dough is old and undesirable. The reason stated for the undesirability of pre-mixing vitamins into a cereal dough is that the vitamins are deactivated during the cooking step.

U.S. Pat. No. 2,345,571 to Briod et al. discloses processes for producing a vitamin fortified, dry product. The processes according to this invention require that a fat soluble vitamin composition be added to an aqueous slurry of a vegetable material. The examples in this patent indicate that the fat soluble vitamin composition is a liquid, oleaginous mixture. The vitamin composition is not added to the vegetable material in a dry powder form.

U.S. Pat. No. 1,575,762 to Hoffman et al. discloses a method of adding dry vitamins, namely, B vitamins, to a bread dough. This method requires devitalizing a yeast and then drying the yeast without rupturing cell walls. The resulting product is added to another food product to supplement its vitamin content. The '762 patent is only concerned with vitamins contained in yeast and not dry powder vitamin mixtures. Additionally, the '762 patent is only concerned with enriching the vitamin B content in foods.

U.S Pat. No. 2,775,521 to Mateles et al. discloses a method for fortifying grain products with dry mixtures of vitamins and minerals. This patent is concerned with coating the grain product with a vitamin coating. The product of this patent is subject to the same problems of undesirable flavor and color variations due to the topical coating of the vitamin on the food product. This patent does not disclose a method for incorporating or distributing the vitamin into the cereal grain mass of the food product.

U.S. Pat. No. 2,497,035 to Seeder discloses a process of preparing a vitamin C enriched baked product. The method of the '035 patent involves adding either dry or wet ascorbic acid to a dough which is then baked. This patent is unconcerned with preparing a cereal product or a product enriched by any vitamins other than vitamin C.

U.K. published patent application Ser. No. B493,950 to Borenstein et al. discloses a composition in which dry vitamin A in powder form is added to a flour. The flour can then be used to prepare baked goods. This patent is unconcerned with the enriching of a cereal product with a dry multivitamin mixture.

As serious as these problems are for heat sensitive vitamins generally, the particular problem associated with the potential fortification of beta carotene overshadows these everyday problems. Unfortunately, R-T-E cereals that have been topically fortified with beta carotene exhibit extremely rapid loss or deterioration in vitamin efficacy due to the extreme instability of beta carotene. While the stability of beta carotene is dependent upon a variety of factors such as temperature, humidity, light, etc., beta carotene appears to have particular sensitivity to oxygen. For this reason, vitamin supplements deliver beta carotene disposed within an opaque oxygen impermeable gelled capsule.

Still another problem that is particularly severe to beta carotene is that the topical application of beta carotene vitamin can result in undesirable stains in the form of red spots that appear on the surface of the cereal pieces. This highly visually unattractive mottled appearance is colloquially referred to as the problem of "fish-eyes." Consumers would immediately reject such a product as being visually unfit for consumption.

U.S. Pat. No. 4,764,388 issued Aug. 16, 1988 to Sullivan et al. discloses a method for preparing a vitamin enriched shredded wheat R-T-E cereal product. The method disclosed therein includes addition of a multiple vitamin mixture which includes selected heat sensitive vitamins, especially the B vitamin, that commonly are therefore topically applied as a dry mix after cooking the cereal grains but prior to shredding and finish hot process steps. However, the '388 patent does not describe the particular problems associated with beta carotene fortification. Also, the patent teaches away from the preferred method of vitamin fortification herein which involves separate addition of the beta carotene and other vitamins to the cooked cereal mass.

Given the state of the art as described above, there is a continuing need for new and improved vitamin fortified R-T-E cereals that include beta carotene fortification and methods for preparing such improved R-T-E cereals.

Accordingly, it is an object of this invention to provide a beta carotene enriched R-T-E cereal.

Another object of the present invention is to provide a method of incorporating or distributing a dry multivitamin premix into a cooked cereal dough before that cooked cereal dough is formed into cereal pieces.

It is a further object of the present invention to provide beta carotene fortified R-T-E cereals that exhibit surprising maintenance of vitamin availability levels even upon extended storage.

It is another object of the present invention to provide beta carotene fortified R-T-E cereals that are visually attractive and avoid mottled surface appearance.

It is another object of the present invention to provide methods for preparing beta carotene fortified R-T-E cereals that minimize the loss of the expensive beta carotene component.

Still another object of the present invention is to provide beta carotene fortified R-T-E cereals that exhibit minimal flavor problems associated with vitamin fortification.

Still another object of the present invention is to provide R-T-E cereal preparation methods that minimize degradation of vitamin activity during processing.

Another object of the present invention is to provide beta carotene and other vitamin fortified R-T-E cereals that exhibit extended beta carotene vitamin activity even upon extended room temperature storage.

It has been surprisingly discovered that the above objectives can be realized and superior vitamin fortified R-T-E cereal products can be prepared. The present improved R-T-E cereals are prepared by methods of R-T-E cereal preparation involving beta carotene incorporation into a cooked cereal mass prior to piece formation rather than by topical application after all hot processing steps. The objectives are achieved without sacrificing activity of the multivitamins and produces a multivitamin enriched R-T-E cereal product without an adverse effect on the flavor or appearance of the cereal product by the incorporated or distributed multivitamins and surprising efficacy and stability of beta carotene.

SUMMARY OF THE INVENTION

In its product aspect, the present invention provides vitamin R-T-E fortified cereal products including beta carotene that exhibits both surprising initial vitamin availability as well as unexpected beta carotene stability over extended storage times.

The R-T-E cereal product includes dispersed homogeneously throughout the R-T-E cereal composition a variety of heat tolerant vitamins as well as the beta carotene. In preferred embodiments, the R-T-E cereal products can additionally include topically applied heat sensitive vitamins but not including beta carotene. The present R-T-E cereal products provide a more visually attractive appearance by not exhibiting fish-eyes or surface color mottling.

In its method of preparation aspect, the present invention resides in methods for preparing the present improved beta carotene and other vitamin fortified R-T-E cereal products.

The present invention's methods for multivitamin enriching a cooked cereal dough essentially comprise the steps in sequence of: A. providing a cooked cereal mass; B. uniformly dispersing a dry multivitamin premix and beta carotene into said cooked mass; C. forming the multivitamin fortified cooked cereal mass into discrete pieces; D. finish drying the discrete pieces to form dried R-T-E cereal pieces; and E. topically applying additional heat sensitive vitamin types to the R-T-E cereal pieces.

The dry multivitamin premix, according to this invention, can be any commercially available multivitamin premix. Most preferably, the vitamin premix is high in B vitamins as well as other fat and water soluble vitamins. A suitable dry multivitamin premix is of a fine particulate matter such that its distribution into the cooked cereal dough is facilitated and occurs without lumping or large particles appearing in the final R-T-E cereal product.

BRIEF DESCRIPTION OF THE DRAWING

FIG. 1 includes a simplified schematic diagram of a highly preferred embodiment of the vitamin cereal fortification process of the present invention.

DETAILED DESCRIPTION OF THE INVENTION

The present invention relates to R-T-E cooked cereal dough products fortified with beta carotene that exhibit unexpected vitamin efficacy stability. In its method aspect, the present invention relates to methods of preparing such beta carotene fortified R-T-E cereal products. Each of the cereal product ingredients as well as process steps and product use are described in detail below.

Throughout the specification and claims, temperatures are in degrees Fahrenheit and percentages are by weight unless otherwise indicated.

A. Providing a Cooked Cereal Mass

Referring now to the drawing, FIG. 1 shows a highly schematic flow diagram of a highly preferred embodiment of the present method referred to generally by reference numeral 10. As there illustrated, the present method includes an essential initial step of providing a cooked cereal mass or dough 12. The cooked cereal mass thus includes a cooked cereal dough or a quantity of cooked cereal grains generally still retaining their individual piece identity (i.e., generally in the form of discrete pieces), e.g., cooked wheat berries. The cooked cereal mass generally has a moisture content ranging from about 15% to 35%.

The prior art, of course, is replete with teachings on methods, apparatus and techniques for preparing a cooked cereal mass and the skilled artisan will have no difficulty selecting useful materials for obtaining a cooked cereal mass. Generally, however, the primary ingredient, of course, of the present cooked cereal dough is a cooked cereal grain.

By way of example, in one variation a dry blend of cereal ingredients is well mixed and then combined with water and mixing with heat to cook or gelatinize the starchy component of the cereal composition. In certain embodiments upon further mixing the gelatinized or cooked cereal can be formed into a cooked farinaceous dough. A variety of well known cooking methods and equipment can be used to prepare a cooked cereal dough. For example, the wetted cereal blend can be processed in a cooker extruder or in a pressurized and agitated steam cooker each of which form a cooked cereal dough (which in turn is fed to a cereal pellet forming extruder). In another embodiment, the cooking and dough forming steps are performed simultaneously in a high pressure, cooker extruder (e.g., a single or twin screw) which discharges the cooked cereal mass in the form of a cooked dough rope extrudate. The cooked cereal dough so formed typically ranges from about 15% to 35% moisture.

In another variation, the cooked cereal pieces comprise cooked grains or fragments such as whole wheat berries or grits, corn cones, oat flakes, and the like, having a moisture content ranging from about 25% to 35%, and most preferably about 28% to 30%. After the first vitamin addition step the cooked grains or fragments can be shaped, such as by flaking or shredding rolls to form shaped pieces which are then subjected to a heating step such as in a toaster or baking oven.

Referring once again to FIG. 1, in a highly preferred particular embodiment of the present invention, the step of providing a cooked cereal dough mass 12 is practiced using a batch cooker cereal system 14. In this embodiment, the primary cereal ingredient is steel cut cereal grains 16, e.g., whole wheat. The cereal blend further comprises minor amounts of supplemental ingredients such as sugar(s), malt or malt syrup(s), salt, water and other dry ingredients 16. In this particular embodiment, the cooking of the cereal grain can be practiced using any standard cooking equipment. The cereal mixture is cooked at temperatures and humidities which hydrate and gelatinize the internal structure of the cereal grain particles. Typically, such temperatures are between about 190° F. and about 225° F. Mixing the cereal grain in the cooking vessel at about 8.5 revolutions per minute provides for even cooking and reduces lumping.

The cooked cereal mass can be made from any cereal grains and starch containing vegetables including those which are members selected from the group consisting of wheat, oats, rice, potatoes, corn, barley, rye, sorghum, triticale, and mixtures of these. In the preferred embodiment whole grain soft wheat is the cereal grain used. Cooking of the wheat grain in the preferred embodiment occurs at 22 psig for approximately 45 minutes. The process can be batch or semi-continuous. This cooking time includes a "come-up time" of between 6.5 to about 8 minutes during which the temperature of the cereal grain in the vat is being elevated from ambient temperature to the cooking temperature. Similar cooking parameters are used with the other grains and grain mixtures.

In the most preferred embodiment, the cooked cereal grain is then extruded to form a cooked cereal dough. The temperature of the dough generally ranges from about 210° to 225° F. In other embodiments, such as for the preparation of a shredded cereal, the cereal mass is not kneaded to form a dough but rather is expelled from the cooker still in the form of discrete grain pieces.

Optionally but preferably, the cooked cereal mass whether in dough or grain form is allowed to temper 20 such as by charging the dough to a dough bin or other holding container. Tempering 20 allows the hydrated, gelatinized cooked cereal dough to sit for a sufficient amount of time to permit complete water hydration and equilibration of the cereal grain particles. Tempering 20 can be greatly accelerated by using high intensity microwave heating. This water hydration solubilizes the starches deposited in the cereal grain. Tempering 20 is also important to elimination of any white streaks of incompletely gelatinized cereal particles. Also, tempering 20 is helpful in developing a cooked cereal flavor.

Tempering times can vary greatly. When using the conventional tempering technique of allowing the cooked cereal mass to stand temper, the most desirable tempering times for cereal grains are between approximately 2 hours to approximately 36 hours. The tempering step 20 is commonly practiced by charging the cooked cereal mass whether in a dough or grain mass form to a dough tempering bin. In the dough tempering bin, the cooked cereal mass can be turned slowly. Tempering times above approximately 12 hours can undesirably result in excess stickiness and brown color development and/or in undesirable off-flavors development. Excessive tempering times can also result in undesirable heat build-up as well as odors due to microbiological activity. Also, undesirably, compaction can result from the cooked cereal dough being stored in large volumes for too long a period within the tempering vessel. Compaction results in "chunks" forming within the cereal grain mass. Most preferably, tempering times are between about 1 hour to between about 4 hours.

Accordingly, optionally, but preferably the tempered cereal dough is subjected to a delumping step 22. A Fitzmill can be used to reduce chunks to smaller particle size when they are formed.

Still other optional steps (not shown) less commonly employed are drying and/or cooling steps to further condition the dough to impart the desired handling attributes.

B. Dispersing the Vitamins/Beta Carotene Into The Cooked Cereal Mass

In the next essential first fortifying step 24, a multivitamin premix and beta carotene are homogeneously dispersed into the cooked cereal mass to form a uniform multivitamin and beta carotene fortified cooked cereal mass composition.

The present vitamin/beta carotene addition can be conveniently practiced as follows. After cooking 14 and tempering 20, and other optional intermediate steps, the cooked cereal dough mass is transferred from the tempering bin or vessel 20 by a suitable means such as a conveyor belt to a hopper which feeds a standard screw conveyor. A first multivitamin premix and the beta carotene are each added with simultaneous mixing to the cereal grain mass at the entry of the screw conveyor to form an homogeneous composition. The admixture of the vitamins can conveniently be practiced by adding the vitamins to the screw conveyor. Of course, other techniques and apparatus can be employed to practice the homogeneous dispersion of the vitamins into the cooked cereal mass. Preferably, the dough temperature ranges from about 90° to 110° F., preferably about 95° to 105° F., and most preferably about 100° F.

The multivitamin premix and the beta carotene can be added to the cooked cereal mass together or separately. In conventional vitamin fortification, a dry blend or premixture of the vitamins is commonly prepared to form a dry multivitamin premix. Such multivitamin premixes are commercially prepared according to the specifications of an R-T-E cereal manufacturer.

It has been surprisingly discovered, however, that when beta carotene is additionally included to such a premixture, that the beta carotene experiences rapid loss in vitamin potency or availability especially when such beta carotene/vitamin preblend is stored at room temperature for the extended times typical of conventional vitamin premix storage practices.

Accordingly, in the present invention either the vitamin premix and beta carotene are not admixed prior to incorporation into the cooked cereal mass or, if premixed, are stored under refrigerated conditions (<5° C.) or even frozen temperatures (<0° C.) prior to addition to the cooked cereal mass. Admixing immediately prior to addition to the cereal is the preferred practice. If desired, the vitamin premix and beta carotene can be premixed and held for short periods (e.g., 2-3 days) prior to addition to the cereal.

Multivitamin premixes suitable for use with this invention not having beta carotene are commercially available such as supplied by the Hoffman La Roche Company. Premixes from other manufacturers are also available and can be made to numerous specifications. Suitable vitamin concentrations can vary widely. Usually, the practice in the cereal manufacturing industry is to add a premix with a multivitamin concentration of approximately 2 to 4 times the actual "Recommended Daily Allowance" or RDA to meet shelf stability requirements. This is because as much as 75% of the multivitamin concentration in cereals can be lost to degradation during normal shelf life periods.

Multivitamin premixes are available both in liquid and dry mix forms. While liquid multivitamin premixes are preferable from an ease of use or convenience standpoint, dry mixes tend to be more stable and are less expensive. The dry vitamins can be added to the cooked cereal in either dry form or can be premixed with water to form a liquid vitamin supply.

A typical multivitamin blend used in this invention is given in Table I.

TABLE 1

| Vitamin | Concentration Range |
|---|---|
| Tricalcium phosphate | 31.967 |
| Vitamin E acetate oil | 17.099 |
| Niacinamide | 11.512 |
| Zinc oxide | 10.682 |
| Reduced iron | 10.309 |
| Calcium pantothenate | 6.193 |
| Dicalcium phosphate, dihydrate | 6.062 |
| Beta carotene 30% w/vegetable oil | 1.996 |
| Pyridoxine hydrochloride | 1.414 |
| Riboflavin | 0.982 |
| Thiamine mononitrate | 0.949 |
| Cyanocobalamin 1% | 0.374 |
| Folic acid | 0.261 |
| Ascorbyl palmitate | 0.200 |
| | 100.000 |

In the above Table, specific vitamin concentrations can vary as is well known. What is surprising is that beta carotene can be beneficially added to the cereal process at this stage without losing so much of its efficacy as to be impractical along with the other non-heat labile vitamins.

Other non-heat labile vitamins and minerals can also be added at this stage. However, such vitamins as A, D, and C should be added later in the process such as by topical application.

In the present multivitamin mix, the tricalcium phosphate is used primarily as a diluent. However, such selection also beneficially supplements the calcium and phosphorous mineral content to the cereal as well.

Other vitamins (e.g., Biotin) and minerals, (e.g., copper, magnesium, and phosphorous) can be optionally included in the dry multivitamin premix. For purposes of this invention the term "first dry multivitamin premix" can include a multivitamin mixture that additionally includes or is fortified with minerals.

Beta carotene is available commercially such as from Hoffman La Roche Co. Both liquid and dry beta carotene are available and either form can be used herein. Dry beta carotene is preferred for its better stability relative to liquid beta carotene. However, dry form beta carotene is more expensive. If cost is the more important concern, then liquid beta carotene is preferably used. Beta carotene is also supplied in liquid form as a 30% active dispersed in a 70% carrier of vegetable oil.

The amount of total diluent selected in the above table can be varied to suit the equipment used to perform the method. The vitamin concentrations can be altered to meet a desired vitamin concentration for a serving unit of the final cereal product. Typically, a serving unit is one ounce by weight of the finished R-T-E cereal pieces. Any non-toxic, therapeutically effective vitamin concentration is acceptable for use with this invention. U.S. Government standards for vitamin levels as established by the Food and Drug Administration are useful in selecting a desired vitamin concentration for a serving unit of an R-T-E cereal product made according to this invention. Good results, however, are obtained when the cereal dough is fortified with about 0.5 to 2.0 mg of beta carotene per ounce of finished product. Typically, vitamin addition is about 100% to 200% of the desired level in the finished product, preferably about 100% to 150%. Such over addition assures that the vitamin level measured in the finished product at some indefinite date in the future will be above the desired threshold value.

The multivitamin premix particulate matter must not be permitted to form lumps before being mixed into the cereal grain mass. This can be accomplished by feeding the dry vitamin premix into the screw conveyor by any gravimetric or volumetric feeder. Such feeders are manufactured by the K-Tron, Accrison, or other companies. Desirable feeders rotate the premix during the feed operation. The relation of the premix breaks up the powder and prevents lumping. Such feeders are a suitable means for adding a dry multivitamin premix to a cereal grain mass.

The feeding of the multivitamin premix to the cooked cereal dough is desirably done at a steady flow rate. The preferred embodiment of the invention method uses a flow rate of 250 g of a dry, multivitamin premix to 100 pounds of the cereal dough (including beta carotene) having between about 25% and about 35% moisture content. This flow rate yields a cereal product having a desirable level of vitamin fortification per serving unit. Similar flow rates are used with other grains such as oats, rice, potatoes, corn, barley, rye, sorghum, or mixtures of these.

The apparatus or means for adding the multivitamin premix to the cereal grain mass must provide a flow rate of premix sufficient to enrich the cereal grain mass to a selected vitamin content. The flow rate must be altered to account for the moisture content and density differences between cereal grains so that the final R-T-E cereal product has an acceptable vitamin concentration. The amount of diluent or other inert ingredients in a multivitamin premix can effect the vitamin flow rate. A multivitamin premix can be custom ordered from most vitamin manufacturers so as to contain a diluent vitamin concentration suitable for the flow characteristics of an apparatus or means for adding the dry multivitamin premix to a cereal grain. The operational speeds of a means for adding the dry multivitamin premix and the screw conveyor can be altered to control the vitamin concentration being mixed into the cereal grain mass.

Generally, the vitamin addition and cooked cereal mass addition to the screw conveyor are continuous. The temperature of the vitamin addition is not critical and typically will be about refrigeration temperature (40° to 65° F.) initially but often increases upon exposure to ambient temperature conditions.

Mixing within the screw conveyor continues until the dry multivitamin particulate matter and the beta carotene are uniformly and homogeneously distributed or dispersed throughout the cooked cereal mass. The temperature of the cooked cereal mass within the screw conveyor is between about 90° F. and 110° F. or slightly above ambient temperature. The B vitamins listed in Table I are considered to be heat labile vitamins. Vitamins A, D and C generally should not be added at this stage because the subsequent temperatures of the pellet dryer and toasting step destroy it.

It has been surprisingly found that in the process of the present invention the finished R-T-E cereal retains between about 60% to about 85% of its initial beta carotene concentration. This results in a significant economic savings by decreasing the amount of beta carotene overages required during manufacturing. Further cost savings are also realized by the direct incorporation of the beta carotene as compared to the 50% loss of vitamin material typically experienced using topical application techniques.

While not wishing to be bound by the proposed theory, it is speculated herein that by virtue of the direct incorporation of the beta carotene into the cooked cereal dough mass, enhanced beta carotene stabilization benefits are obtained. While beta carotene is indeed sensitive to heat and can experience loss of vitamin potency upon prolonged exposure to heat, beta carotene appears to have even greater sensitivity to oxygen. By homogeneously mixing the beta carotene with the cooked cereal mass, the cooked cereal acts as a protective barrier to exposure to oxygen. Even though the beta carotene fortified cereal mass in the present process is subsequently exposed to elevated temperature steps that can result in some loss of beta carotene potency, the level of beta carotene activity of the finished R-T-E cereal after extended storage (typical of R-T-E commercial distribution and sales) e.g., one to four months, is still dramatically higher than if the beta carotene were topically applied after such high temperature steps.

C. Forming a Finished R-T-E Cereal Piece

Thereafter, the vitamin (including beta carotene) fortified cooked cereal mass is then formed into finished R-T-E cereal pieces. This general step 26 can include a variety of various combinations of cereal processing finish steps. Broadly, this forming step 26 involves the general substeps of shaping 28 the cooked cereal mass into desirably sized and shaped pieces and then finish drying 30 the pieces to form a finished R-T-E cereal piece.

As indicated above, the present invention finds utility for use in connection with the preparation of a wide variety of R-T-E cereal products, both puffed and flaked. In a wide variety of R-T-E cereal manufacturing processes, the cooked cereal mass is formed into pellets prior to further processing as an intermediate shaping step 32 and/or pellet drying 34.

In preferred embodiments, from the screw mixer the vitamin fortified, homogeneously blended cooked cereal mass composition is conveyed or fed to hoppers which in turn feed a conventional pellet former 32. Any conventional pellet forming system can be used to conduct this substep. The pellets are then dried 27 to a moisture content of about 16% to 20%, preferably about 18% in a pellet drier to form dried pellets.

The finish drying step 30 can be practiced by or comprise puffing, toasting, baking or other steps involving moisture reduction and elevated temperatures.

For example, in a highly preferred embodiment, a flake type cereal product is desired, and the beta carotene cooked cereal mass is initially formed into cooked cereal dough pellets.

The pellets or pieces are next flaked using flaking rolls 36 so as to produce flakes of desired flake thickness which generally is in the range of 0.015 to 0.020 inch. Generally, these thin flakes are then tenderized or toasted as the drying step 30 to enhance their crispness and tenderness.

A flake cereal is usually tenderized, toasted and partially expanded by rapid heating which converts the dense, hard flakes into more palatable, porous, tender flakes. The toasting operation also enhances the color and flavor of the finished cereal product. Toasting 30 can be accomplished by heating the flakes, usually to 200° to 600° F. Toasting of the formed R-T-E cereal pieces can be practiced in conveyor dryers, vacuum dryers, or other commercial baking equipment. The cereal pieces are toasted, preferably between about 400° and about 600° F. for about 3 to 10 minutes or until a moisture content of approximately 2% to 5% is obtained. A moisture content over 8% destroys water soluble vitamins.

In another variation, if a puffed R-T-E cereal product is desired, the finishing step 26 can comprise puffing as the particular drying substep 30 embodiment, e.g., gun puffing or in a fluidized bed heated with hot air such as a Jet Zone ™ (Wolverine Corp.), to form puffed pieces which may then include a sugar coating step.

In still another variation, cooked cereal grains or pieces can be shredded using shredding rolls 28 to form shreds and then baked (as substep 30) to form a shredded R-T-E cereal. In another variation, the shredded cereal is formed into layers to form a shredded cereal biscuit. In even more particular shredded cereal embodiments, the shredded biscuits are filled such as with a fruit filling or a confection (e.g., a water based icing composition).

If desired, the dried R-T-E cereal pieces can be further processed to add an exterior or topical application of heat sensitive vitamins 40. A particularly useful combination of vitamins for topical application consist of vitamins C, A and D and mixtures thereof. Of course, the topical application of beta carotene is undesirable for the stability and appearance concerns discussed herein. Vitamin C and other heat labile vitamins can optionally be sprayed onto the cereal pieces after the drying substep 30. Vitamins C, A and D do not have an unpleasant visual appearance as does beta carotene, and therefore, their topical application is acceptable to consumers. If desired, the vitamin fortified finished R-T-E cereal pieces can be additionally sugar coated 42 to provide presweetened, vitamin fortified finished R-T-E cereal pieces.

The beta carotene and other vitamin fortified cereal pieces are then ready for packaging 44 and consumption. The R-T-E cereal pieces resulting from this method do not contain mottled appearance or other discoloration which is typically found on cereal particles which have had vitamins applied onto their surfaces. Moreover, the so prepared R-T-E cereals exhibit not only high initial values of beta carotene availability but also surprisingly high availability values even upon extended room temperature storage.

This invention is further understood from the following examples.

EXAMPLE 1

A flake wheat R-T-E cereal of the present invention fortified with beta carotene and other vitamins is prepared having the following formulation. The vitamins are those listed in Table I above. The formula and procedure for making this embodiment, which is the preferred embodiment, are below:

TABLE II

| Ingredients | Amounts |
| --- | --- |
| Wheat (13% moisture) | 3000 pounds |
| Vitamin premix* | 1200 grams |
| Sugar syrup (180° F.) | 500 gallons |
| Sugar | 27% |
| Salt | 4% |
| Malt syrup | 4% |
| Tricalcium phosphate | 5% |
| Water | balance |

*Vitamin content and concentrations are the same as detailed in Table I.

The wheat is placed into a cooking vat with the hot sugar syrup and cooked in a batch cooker to a temperature of 210° F. for 30 minutes with mixing. Following cooking, the cereal grain mass is drained and cooled to ambient temperature by a dryer. This dryer or means for cooling blows 40° F. air across the conveyed portion of the cereal grain mass for between 8 to 10 minutes. The cereal grain mass is then allowed to temper for 8 hours and obtains an average moisture content of 28%. Following tempering the cereal grain mass is conveyed to a delumper where it is delumped and then next to a screw conveyor and mixed with the dry multivitamin premix including beta carotene until an homogeneous composition is obtained. The dry multivitamin/beta carotene premix is added to the cereal grain mass near the entry point of the cereal grain mass into the screw conveyor by a feeder. The injection of the multivitamin premix is at a flow rate of 250 g of premix per 100 pounds of tempered wheat passing through the screw conveyor.

The homogeneously vitamin and beta carotene fortified cooked cereal mass is then fed to a pellet former which forms the cooked cereal mass into a dough and forms the dough into pellets. The pellets are next air dried to a moisture content of about 16% to 20%. The dried pellets are next flaked to form wet flakes. The flakes are then dried/toasted to form whole wheat toasted flaked cereal pieces having a moisture content of about 2%. The flakes are then further vitamin fortified with heat labile vitamins A, D, and C by an aqueous dispersion. The vitamins are added to the flakes in an enrober to obtain a finished product having about 2.5% moisture. The finished whole wheat flaked R-T-E cereal fortified with multivitamins including beta carotene are then conventionally packaged and distributed.

The finished cereal exhibits an excellent appearance and does not exhibit surface discoloration or mottling. The products further exhibit high levels of beta carotene availability and excellent beta carotene stability upon extended storage. An additional advantage, especially for whole wheat containing compositions, is that conventional color additives (e.g., annatto) addition can be reduced or eliminated, and in preferred embodiments are avoided (i.e., are free of added colorants). Such colorant(s) addition reduction or elimination is due to the strong color of beta carotene. Such a colorant-free R-T-E product is perceived by the consumer to be desirably more natural by having fewer additives.

In another variation to prepare a shredded cereal, the multivitamin premix and cereal grain composition can be dropped from the screw conveyor into a series of feed hoppers which supply the shredding rolls. Shredded sheets of the multivitamin premix and cereal grain composition are formed into three laminae on a conveyor belt. The laminae are transported to a cutter which scores the laminated, shredded sheet into cereal particles of 0.9 inch in length and by 0.8 inch in width. The average depth of the cereal particles are 0.2 inch. The scored, shredded sheet is then conveyed to an oven and dried at 500° F. for between five to seven minutes or until reaching an average moisture content of between about 2% to about 3.5%. The baked, shredded sheet is then cooled to below 100° F. and mechanically broken into distinct cereal pieces. The pieces are then topically coated with the heat sensitive vitamins. The pieces are then packaged.

EXAMPLE 2

These examples use the same method as detailed in Example 1 except that 3000 pounds of either oats or corn can be cooked and subsequently enriched with the adding of the dry multivitamin premix into the selected, tempered cereal grain mass. The concentration of vitamins in the final cereal pieces can vary slightly from the cereal pieces of Example 1 because of the variations that these cereal grains have in hydration and density from wheat after tempering. Regardless of this difference, the resultant multivitamin concentration in the fortified cereal pieces is at safe levels.

EXAMPLE 3

A composition of the present invention was prepared with the process of Example 1 having the following formulation:

| Ingredients | Weight % |
| --- | --- |
| Wheat cereal | 80.640 |

-continued

| Ingredients | Weight % |
|---|---|
| Sugar | 11.010 |
| Salt | 1.618 |
| Malt syrup | 1.369 |
| Trisodium phosphate, granular | 0.103 |
| Tricalcium phosphate | 1.894 |
| Vitamins and Minerals | |
| Tocopheryl acetate | 0.201 |
| Niacinamide 99% | 0.106 |
| Iron, reduced 99.5% | 0.071 |
| Pyridoxine HCL 81% | 0.064 |
| Riboflavin 99% | 0.009 |
| Thiamin mononitrate 99% | 0.006 |
| Cyanocobalamin 87% | 0.006 |
| Dicalcium phosphate | 0.003 |
| Folic acid 88% | 0.002 |
| Zinc oxide (80% ZN) | 0.037 |
| Calcium pantothenate 92% | 0.066 |
| Beta carotene in oil (soybean/cottonseed) | 0.041 |
| Ascorbyl palmitate | 0.008 |
| Sodium ascorbate | 0.001 |
| Vitamin A palmitate | 0.276 |
| D-L Alpha-tocopherol | 0.012 |
| vitamin D | 0.001 |
| Polysorbate 80 (emulsifier) | 0.010 |
| Propylene glycol | 0.023 |
| Mono & diglycerides | 0.012 |
| BHT | 0.001 |
| Gum arabic | 0.010 |
| | 97.600 |
| Moisture | 2.400 |
| | 100.000% |

R-T-E cereal compositions of substantially comparable vitamin stability and surface appearance are obtained when in the above formulation, the vitamin concentration is increased or decreased by 25%.

EXAMPLE 4

This Example uses the same method and formula as detailed in Example 1 except that the multivitamin is admixed with water and the beta carotene is in liquid form dispersed in soybean oil.

What is claimed is:

1. A method for providing a multivitamin enriching an ready-to-eat (R-T-E) cereal product with beta carotene that exhibits vitamin efficacy stability and improved visual appearance, comprising:

A. providing a cooled cooked cereal mass having a moisture content of about 15% to 45% and having a temperature of about 90° to 110° F., wherein said cereal grain mass has a moisture content of between about 25% and about 55% by weight;

B. thereafter uniformly dispersing beta carotene into said cooked cereal mass with sufficient simultaneous mixing to form an homogeneous beta carotene fortified cooked cereal mass composition, wherein step B further includes dispersing a first multivitamin premix comprising heat tolerant vitamin types and wherein said cereal grain is a member selected from the group consisting of wheat, oats, rice, corn, barley, rye, sorghum, and mixture of these;

C. forming the beta carotene fortified cooked cereal mass into discrete pieces;

D. finished drying the discrete pieces for dried R-T-E cereal pieces having a moisture content of less than 5%, including the substeps of
　　1) forming the cooked cereal mass into cereal pellets,
　　2) drying the cereal pellets to a moisture content of about 15% to 22%,
　　3) flaking the cereal pellets to form wet flakes, and
　　4) toasting the wet flakes to form toasted dried flaked R-T-E cereal pieces having a moisture content of about 1% to 3.5%: and, E. topically applying additional heat sensitive vitamin types to the R-T-E cereal pieces to form a multivitamin enriched, beta carotene containing R-T-E cereal.

2. The method of claim 1 wherein in step E the additional heat sensitive vitamins comprise vitamins A, C and D.

3. The method of claim 2 wherein in step B, the multivitamin premix is in dry form.

4. The method of claim 3 wherein the beta carotene is in dry form.

5. The method of claim 4 wherein the cooked cereal grain includes wheat and has a moisture content of about 25% to 35%.

6. The method of claim 5 wherein the cooked cereal grain includes corn.

7. The method of claim 2 wherein in step A the cooked cereal mass is provided by cooking a cereal grain at temperatures and humidities which hydrate and gelatinize cereal grain internal structure to form a gelatinized, wet cereal grain mass and subsequently tempering the cooked cereal mass at about 215° to 230° F. at 25% to 35% moisture for about 6 to 12 hours.

8. A vitamin fortified R-T-E cereal exhibiting improved vitamin stability and improved surface appearance comprising:

an R-T-E cereal piece having an exterior surface fabricated from an R-T-E cooked cereal composition having homogeneously dispersed there through a vitamin combination comprising heat tolerant vitamins and beta carotene and including a plurality of heat sensitive vitamins topically applied to the exterior surface, wherein the beta carotene comprises about 25 to 40 mg per kilogram of the R-T-E cereal composition, wherein the heat sensitive vitamins are selected from the group consisting of vitamin A, vitamin C, vitamin D and mixtures thereof, wherein the heat sensitive vitamins are selected from the group consisting of vitamin A, vitamin C, vitamin D and mixtures thereof, wherein the R-T-E cereal is in a flake form and is toasted, and, wherein the R-T-E cereal is free of added colorants.

* * * * *